May 8, 1962 L. K. HOOPER ET AL 3,033,023
LEAK DETECTING APPARATUS
Filed Sept. 30, 1957 2 Sheets-Sheet 1
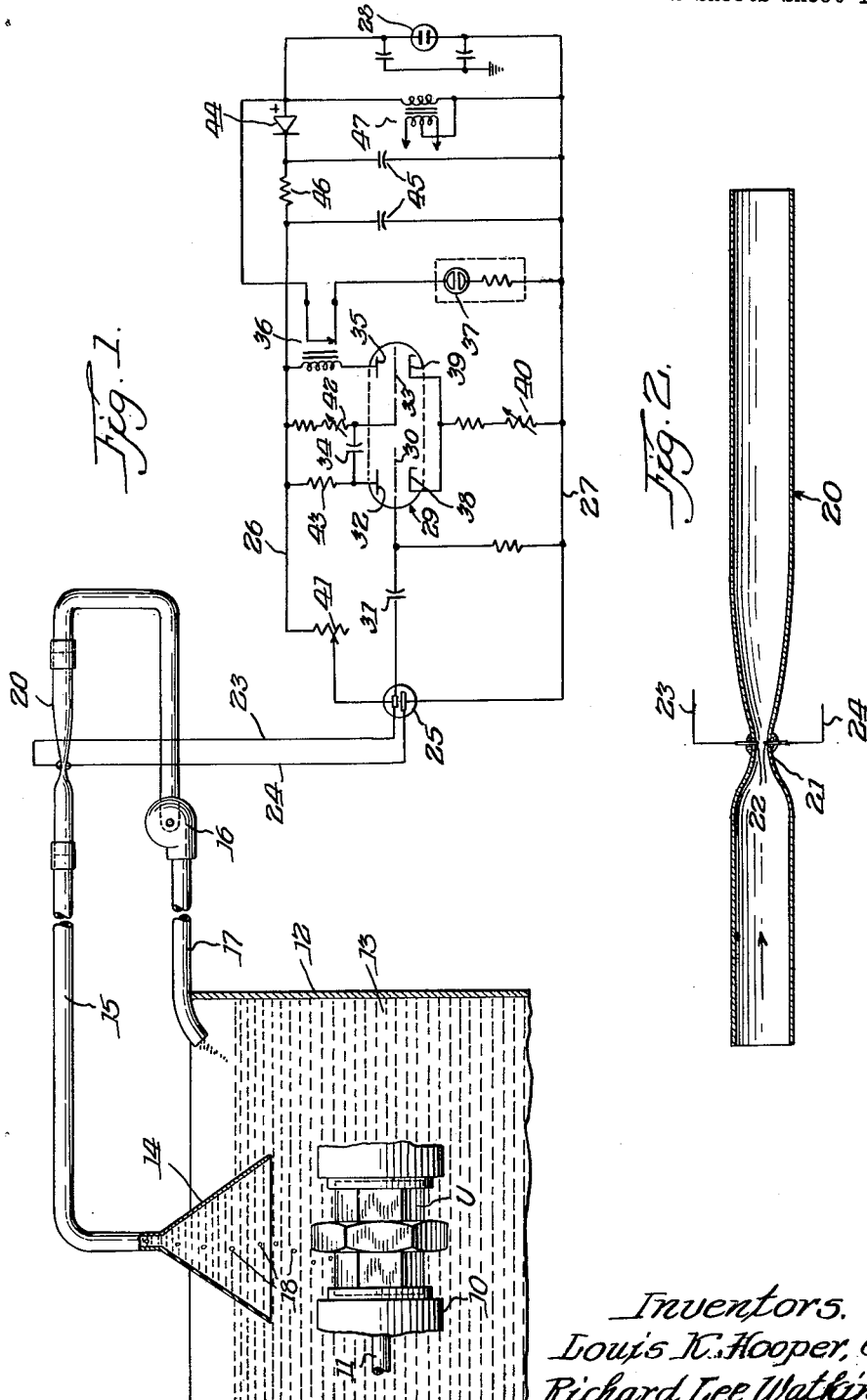
Inventors.
Louis K. Hooper, &
Richard Lee Watkins,
By Joseph O. Lange
Atty.

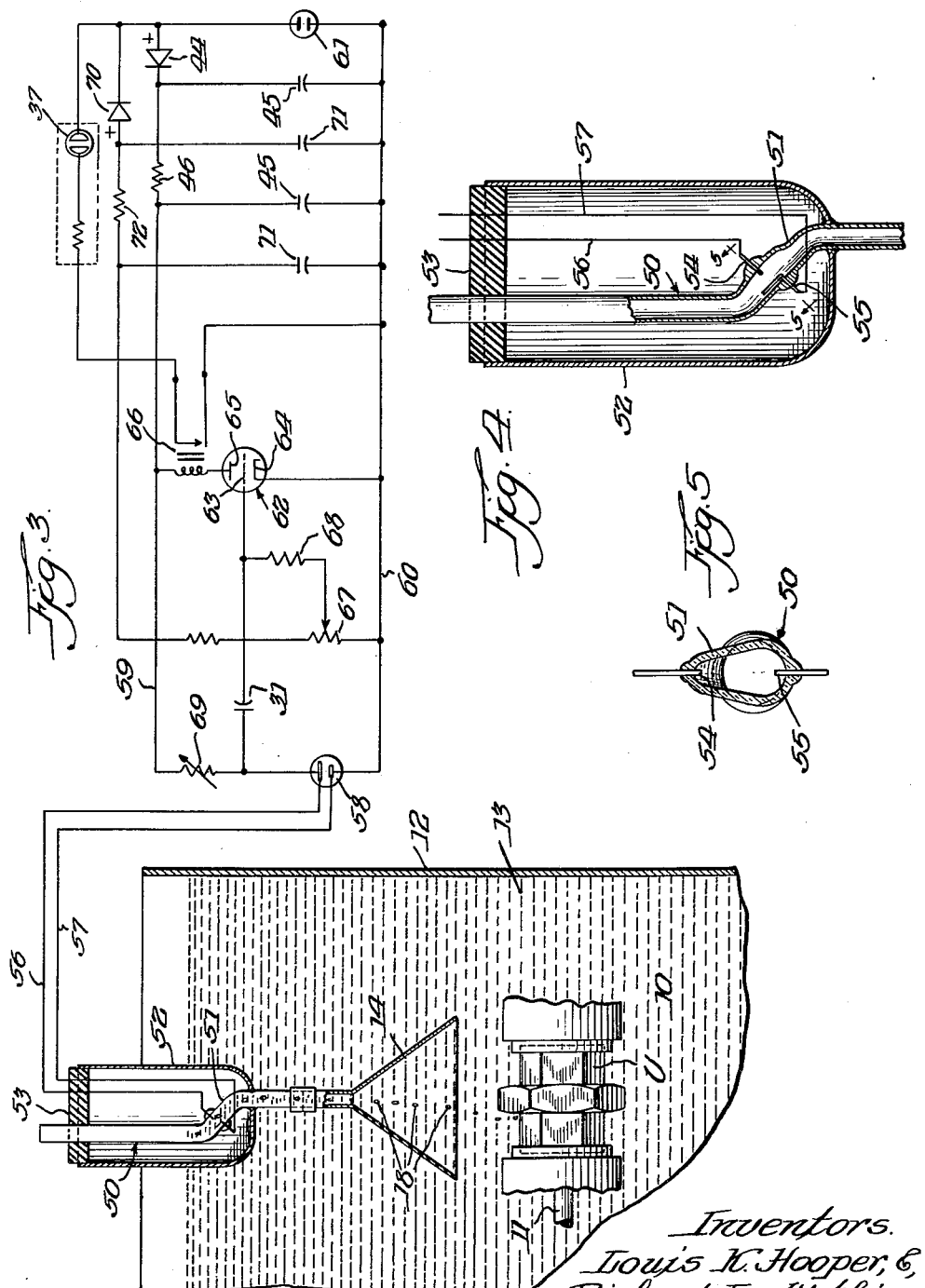

United States Patent Office 3,033,023
Patented May 8, 1962

3,033,023
LEAK DETECTING APPARATUS
Louis K. Hooper, La Grange Park, and Richard Lee Watkins, Chicago, Ill., assignors, by direct and mesne assignments, to Crane Company, Chicago, Ill., a corporation of Illinois
Filed Sept. 30, 1957, Ser. No. 687,287
3 Claims. (Cl. 73—45.5)

The present invention relates generally to apparatus for detecting leaky pipe fittings or other hollow articles, and more particularly to apparatus of this type which is extremely sensitive and positive in operation.

In production manufacture and testing of pipe fittings and other hollow articles for leaks, it is important that every leaky article be detected. Otherwise, the testing is without particular point, because even a single leaky article escaping detection may result in considerable damage and expense when put in actual service, and the validity of the inspection is accordingly placed in question. One manner of testing such articles is to subject them internally to air under pressure while immersed in a liquid and observe whether any bubbles of air escape therefrom. Escaping bubbles of course indicate a leak in the article. However, such visual observation is subject to human error and the possibility of distraction of the inspector's attention. Furthermore, where a certain degree of leakage under test is permissible, it often becomes a matter of the individual inspector's judgment whether a leak indication requires rejection of the article, and a "leaker" may well be passed as satisfactory, especially since under usual conditions only a brief inspection interval is allotted for each article. The apparatus provided by this invention responds to escaping bubbles, but operates automatically to detect leaks and indicate articles to be rejected. It is positive, precise, and sensitive in response, and is adaptable to operate at different degrees of leakage. It may be employed instead of an inspector, and may be arranged to mark or reject the defective article. The apparatus can operate at a speed definitely in excess of that possible with visual observation, and thus permits reduction of costs.

It is an object of the invention to provide automatic apparatus for detecting leaks in hollow articles responsive to bubbles of fluid escaping from leaky articles.

It is another object to provide automatic leak-detecting apparatus for hollow articles which is rapid and positive in action and accurate in operation.

Another object is the provision of such apparatus which is very sensitive in response, and which may be adapted to varying degrees of sensitivity.

Another object is the provision of apparatus for leak-testing hollow articles which registers the presence of leaks in any of the articles.

A further object is the provision of automatic apparatus for detection of leaks in hollow articles which may be employed with or without an inspector.

Other and further objects, advantages, and features of the invention will be apparent to those skilled in the art from the following detailed description, taken in conjunction with the accompanying drawings, in which:

FIG. 1 is a diagrammatic representation of one embodiment of the invention;

FIG. 2 is an enlarged longitudinal sectional view of the conductivity cell shown in FIG. 1;

FIG. 3 is a diagrammatic showing of another embodiment of the invention;

FIG. 4 is an enlarged vertical sectional view of the conductivity cell shown in FIG. 3; and FIG. 5 is an enlarged sectional view taken substantially on line 5—5 of FIG. 4.

Referring first to FIGS. 1 and 2 of the drawings, there is shown a pipe fitting as the hollow article being subjected to a leak test, in this case a pipe union U. The union is clamped between the opposed gasketed heads of a chuck 10, through one of which extends a conduit 11 by which air or other suitable gas under pressure is supplied to the interior of the fitting, which is otherwise closed by the chuck parts. The chuck is mounted on any suitable mechanism for movement through a tank 12 which contains a liquid 13 such as water, a rust preventative mixture, oil, or the like, the fitting being submerged in the liquid in the tank. A hood-like collecting member 14 is disposed above the path of movement of the fitting through the tank, being at least partially immersed in the liquid. Connected to the collecting member 14 and communicating therethrough with the interior of the tank is a suitable conduit 15 which leads to a centrifugal pump 16 which in operation draws liquid from the tank through the collecting member and conduit and returns it to the tank through a discharge conduit 17.

As the union U is moved underneath the collecting member, bubbles of air 18 which escape therefrom if the union is leaky pass upwardly into the member 14 and are drawn with the circulating liquid by the pump 16 through the conduit 15 and discharged through the conduit 17. Interposed in the conduit 15 between the collecting member 14 and the pump at any convenient point is a conductivity cell 20 which may be formed of glass or other suitable material. The cell is generally tubular in form, and has an intermediate constricted portion 21 of a diameter considerably smaller than the diameter of the major portion of the cell, the cell on the approach side of the constriction tapering relatively abruptly, and on the other side flaring gradually to the main cross section of the cell. The shape of the cell is generally as shown in FIGS. 1 and 2. A pair of electrodes 22 is provided, each extending into the interior of the cell at the constriction 21, the electrodes being spaced apart so that a gap is provided therebetween. The electrodes are connected by leads 23 and 24 and a suitable connector 25 to lines 26 and 27 comprising part of an electric circuit energized from a suitable receptacle 28 or other means connected to a suitable source of electric energy (not shown). From the description so far given, it will be evident that as the liquid 13 flows through the cell 20, it contacts the electrodes 22, and completes the circuit so that current flows between the electrodes, representing a normal output of the cell. When a bubble of air passes through the cell, it is forced by the tapered approach to pass through the path of current flow between the electrodes 22 before passing on through the cell. Although not necessary, it is preferable that the bubble encompass one or both of the electrodes, and the abrupt taper of the cell on the approach side does not only guides bubbles through the current path but tends to assure that they will, by reason of the constriction, surround at least one of the electrodes. Passage of a bubble through the path of current between the electrodes decreases the conductivity of the cell and thus causes an abrupt variation or pulse in the output which is utilized to indicate the fact that the union passing under the collecting member is a leaky one, each bubble causing a pulse in the electrode circuit.

These pulses are utilized for triggering actuation of a relay controlling the circuit of suitable indicating means, by means of a pair of triodes, in this case shown as a dual triode 29, the first grid 30 of which is connected to the lead 23 through a coupling condenser 31. The first plate 32 is coupled to the second grid 33 by a condenser 34 of suitable value, and the second plate 35 is connected to the winding of a normally closed relay 36, the armature of which closes the circuit of the neon light 37 when the relay is actuated by deenergization of its winding. The light 37 gives an indication of the passage of a bubble through the cell 20. Of course, an audible alarm signal may be employed instead of the light 37, and if desired, instead of or in addition to the signal, a circuit may be employed to operate marking mechanism for marking the fitting to which the indication applies, or to the portion of the mechanism carrying such fitting. The cathodes 38 and 39 are connected to the other electrode lead 24 through a variable resistance 40, by which the circuit is adjusted so that it does not trigger on the random noise generated by the conductivity cell 20, or which, in other words, controls the level which the pulses must attain to trigger relay actuation. A variable resistance 41 is connected in parallel between the electrode lead 23 and the first plate 32. By adjustment of this resistance, the sensitivity of the circuit may be adjusted. It will be appreciated that when a group of bubbles escapes from the union U during the time it passes beneath the collecting member 14, they will generate a group of pulses each tending to cause actuation of the relay 36. This of course would cause chatter of the relay, assuming the pulses are of sufficiently long duration to allow the relay to respond. In actual practice, the pulses are of such short duration that only a relay of special and expensive construction could be employed therewith if provision were not made to enable utilization of an ordinary relay, as by a pulse extender circuit. The grid 33 is therefore connected to the line 26 through a variable resistance 42, and the first plate 32 is connected to the same line through a fixed resistance 43. By this arrangement, a short pulse at the input of the triode circuit causes the current in the winding of relay 36 to be interrupted for a length of time depending on the magnitude of the coupling condenser 34 between the triodes, the resistance of the first plate, and the resistance of the second grid. The last, of course, includes the variable resistance 42, by which the length of time the relay armature remains deenergized is adjusted. It will be evident that a single bubble passing through the cell 20 will deenergize the relay coil to cause the relay contacts to close for the desired length of time, and that during this time any additional bubbles which may pass through the cell, while resulting in short input pulses, will have no effect on the relay circuit. To assure a positive potential on the plate 32, a rectifier 44 is provided in the line 26, together with filter condensers 45 and a resistance 46 for smoothing out ripple voltage, to supply unidirectional current to the plate. A transformer 47 is provided across the lines 26 and 27, from the secondary of which the filaments (not shown) of the triodes may be heated.

In FIGS. 3 to 5, there is shown another embodiment of the invention adapted particularly to operation without circulation of the liquid, or with circulation thereof at a relatively slow rate. The fitting U is held in the chuck 10 and air or other suitable gas under pressure is supplied to the interior thereof by the conduit 11, the fitting being submerged in the liquid 13 contained in the tank 12, and being attached or positioned under the collecting means 14 so that the bubbles 18 escaping from a leaky fitting will be prevented from random escape to atmosphere, all substantially as in the first-described embodiment. Supported in communication with the upper portion of the collecting member 14 is a conductivity cell 50 of tubular construction having straight substantially vertically arranged end portions connected by an intermediate portion 51 extending upwardly at an angle therebetween, the end portions being thus offset somewhat from each other. The lower end portion of the cell is connected to the member 14, while the upper end portion opens to the atmosphere above the level of the liquid 13 in the tank. The collecting member 14 and cell 15 are arranged so that the liquid fills the member 14 and also fills the cell 50 at least to above the intermediate offset portion 51. A jacket 52 is provided surrounding the upper part of the cell 50 with its lower end closed about and sealed to the lower end portion of the cell. The upper end of the jacket has an open mouth which may be closed by a suitable plug 53 of rubber or the like apertured for the extension of the upper end portion of the cell therethrough. The intermediate offset portion 51 of the cell is formed with a cross section of generally tear-drop shape, as well shown in FIG. 5, the narrower portion being uppermost. Projecting into the intermediate portion 51 through the upper and lower wall portions thereof and in sealed relation therewith are a pair of electrodes 54 and 55. The upper electrode 54 projects only slightly into the narrow portion of the cell portion 51, and the lower electrode 55 is relatively large and extended along the lower portion, so as to reduce spurious resistance changes which may result from bubbles forming on the electrodes because of electrolysis of the liquid. Leads 56 and 57 respectively connect the electrodes 54 and 55, as through a connector 58, to lines 59 and 60 of a detecting circuit, these lines being connected through a conventional receptacle 61 or other suitable connecting means to a source of electricity (not shown). The leads extend through the plug 53 of the jacket 52 which protects the electrodes and the leads from contact with the liquid in the tank.

It will be evident that bubbles 18 escaping from a pipe union U or other fitting rise through the liquid in the tank, collector, and cell, passing between the electrodes 54 and 55 before escaping to atmosphere through the upper end portion of the cell 50. In passing through the intermediate angularly offset portion 51, the bubbles move through the current path between the electrodes, and preferably directly across at least the upper electrode, and thus cause a pulse by reason of the change in conductivity or resistance from the liquid 13 through which the circuit between the electrodes is normally completed. The teardrop section chosen for the intermediate portion 51 of the cell 50, together with the slight projection of the upper electrode 54 thereinto, assures that even very small bubbles moving through the cell will pass through the current path between the electrodes so as to affect the conductivity of the cell and cause a pulse. Such bubbles, in fact, which otherwise might pass to one side or the other of the current path between the electrodes, or of the electrodes, particularly the upper electrode, are channeled so as to pass between the electrodes and to surround the projecting end of the electrode 54 in passing. It should be obvious that instead of the guttiform section specifically disclosed, the cell portion 51 may have some other constricted form which will attain the desired result of assuring that bubbles of the minimum size to be detected, or greater, do not pass through the cell without causing a variation in its output.

To utilize such a pulse to operate a relay, there is shown a detecting circuit including the lines 59 and 60 energized through the receptacle 61. A single triode 62 is employed, the grid 63 being connected through line 59 and the coupling condenser 31 to the lead 56, and the cathode 64 being connected to the other lead 57 through line 60. The plate 65 is connected to one end of the winding of a normally open relay 66, the other end of the winding being connected to the line 59. A positive pulse on the grid will cause plate current to flow and close the relay 66, to illuminate the neon indicating light 37 or actuate other indicating means, as in the case of the previously described embodiment. As in that embodiment, a suitable circuit may be substituted for or added to the indicator 37 to mark or reject the fitting giving rise to the indication. The variable resistance 67 is connected across the grid by which may be biased to cut off for controlling the magnitude of the plate current, thus regulating the level of pulses to which the relay will respond. A grid resistor 68 between the grid and the biasing resistor 67 prevents grounding of the pulses. Another variable resistance 69 is connected to a positive high-voltage source, as through line 59, and to the lead 56 for adjusting the current in the cell to a value giving optimum pulses upon passage of bubbles therethrough. As in the first embodiment, a rectifier 44 with filtering condensers 45 and a resistance 46 is provided in line 59 to assure a positive potential on the plate 65. Another rectifier 70 is arranged in series with the biasing resistor 67 to place a negative bias on the grid 62, and filtering condensers 71 and resistance 72 are provided to smooth out ripple voltage.

It will be apparent that any suitable gas may be employed instead of air for escaping from leaky articles to attain the purpose of this invention, and in fact that any two fluids of different densities and electrical conductivity may be employed instead of the liquid 13 and air under pressure as specifically described, provided they are substantially immiscible under the conditions of operation so that the one supplied under pressure to the interiors of the test articles will remain distinct from the other, in the form of bubbles, drops, or similar globules, so as to effect a distinct change in the output of the cell upon passing between the electrodes. It will also be evident that the fluid which is applied under pressure to the articles may have, instead of lower conductivity, greater conductivity than the fluid in which the articles are immersed, and achieve the results of the invention by an appropriate modification of the circuits.

In the case of both circuits illustrated in the drawings, it is assumed that alternating current is supplied by the source of electricity, so that rectifier means are employed in the circuits to assure that the current flowing through the conductivity cell and to the plate of the electronic tube is unidirectional. Of course, if a direct current electrical supply is employed, the rectifiers and the filtering elements associated therewith are unnecessary.

The invention is susceptible of considerable modification and adaptation to varying applications, and is not limited to the specific embodiments herein disclosed by way of example. It is therefore not intended that the invention be limited otherwise than as required by the spirit and scope and the appended claims.

We claim:

1. Apparatus for detecting a leak in a pipe union and like hollow article, comprising means for closing the article, means for supplying air under pressure to the interior of the article, means for submerging the pressure-subjected articles in a liquid, collecting means for trapping air bubbles leaking from the article, means continuously drawing liquid and bubbles from said collecting means, a conductively cell in said drawing means having a pair of spaced electrodes, an electric circuit including said electrodes passing electric current between said electrodes to produce normal output when liquid passing through said cell completes a circuit with the electrodes and to vary said output when a bubble in the liquid passes between the electrodes, and means responsive to variation in the normal output to indicate passage of a bubble through the cell and thereby leakage from an article.

2. Apparatus for detecting a leak in a pipe fitting and like hollow article, comprising means for closing the article, means for immersing the article in a liquid, means for supplying a gas under pressure to the interior of said article during immersion thereof to effect escape of bubbles of said gas from leaky article, means for preventing escape of said bubbles to atmosphere, means drawing liquid and entrained bubbles from said preventing means, a conductivity cell arranged for passage of the liquid and entrained bubbles therethrough having a pair of spaced electrodes extending therein in electric circuit relation completing a circuit through the liquid in the cell to produce a normal output and varying said output upon passage of a bubble between the electrodes, and means responsive to such variation of the output to indicate the bubble passage.

3. Apparatus for detecting a leak in a hollow article, comprising means for closing the article, means for immersing the article in a first fluid, means for supplying a second fluid under pressure greater than that of said first fluid to the interior of the article while immersed for effecting escape of globules of said second fluid from leaky article, said fluids being of different density and electrical conductivity, a conductivity cell having a pair of electrodes in electric circuit relation extending therein in spaced relation and means for drawing the first fluid and globules of the second fluid entrained therein through said cell past said electrodes for completion of said circuit between the electrodes by the first fluid to produce a normal output and to vary said output upon passage of a globule of the second liquid between the electrodes.

References Cited in the file of this patent

UNITED STATES PATENTS

| | | |
|---|---|---|
| 684,832 | Leiger | Oct. 22, 1901 |
| 2,632,795 | Boucher | Mar. 24, 1933 |
| 2,234,056 | Moore | Mar. 4, 1941 |
| 2,258,045 | Christie | Oct. 7, 1941 |
| 2,432,814 | Schmidt | Dec. 16, 1947 |
| 2,594,668 | Mannal | Apr. 29, 1952 |
| 2,719,287 | Bartlett | Sept. 27, 1955 |
| 2,766,613 | Williams | Oct. 16, 1956 |
| 2,892,976 | Thayer | June 30, 1959 |
| 2,898,549 | Miller | Aug. 4, 1959 |